United States Patent [19]
Derrer

[11] 3,783,495
[45] Jan. 8, 1974

[54] CABLE DE-LASHING TOOL

[76] Inventor: Carson E. Derrer, 6821 104th St., N.W., Gig Harbor, Wash. 98335

[22] Filed: Dec. 4, 1972

[21] Appl. No.: 312,188

[52] U.S. Cl..... 29/426, 254/134.3 R, 254/134.3 CL
[51] Int. Cl............................................. B23p 19/00
[58] Field of Search............ 254/134.3 R, 134.3 CL, 254/134.3 PA; 29/426, 427

[56] References Cited
UNITED STATES PATENTS

| 3,172,642 | 3/1965 | Eitel | 254/134.3 R |
| 3,174,725 | 3/1965 | Pfundt | 254/134.3 CL |
| 3,191,910 | 6/1965 | Eitel | 254/134.3 R |

Primary Examiner—Charles W. Lanham
Assistant Examiner—James R. Duzan
Attorney—Eugene D. Farley

[57] ABSTRACT

A tool for stripping lashing wire from cable assemblies comprising a utility cable lashed to a support line comprises a trolley which rides along the support line and mounts a wire stripping bar arranged for placement between the utility cable and support line in bearing engagement with the lashing wire which in a preliminary operation has been severed into lengths. Upon moving the trolley along the support line, the bar pushes the lashing cable ahead of the trolley, forming a loose ball comprised of wire strands. At periodic intervals these are clipped and the lashing wire removed, thus freeing the cable from the support line.

9 Claims, 3 Drawing Figures

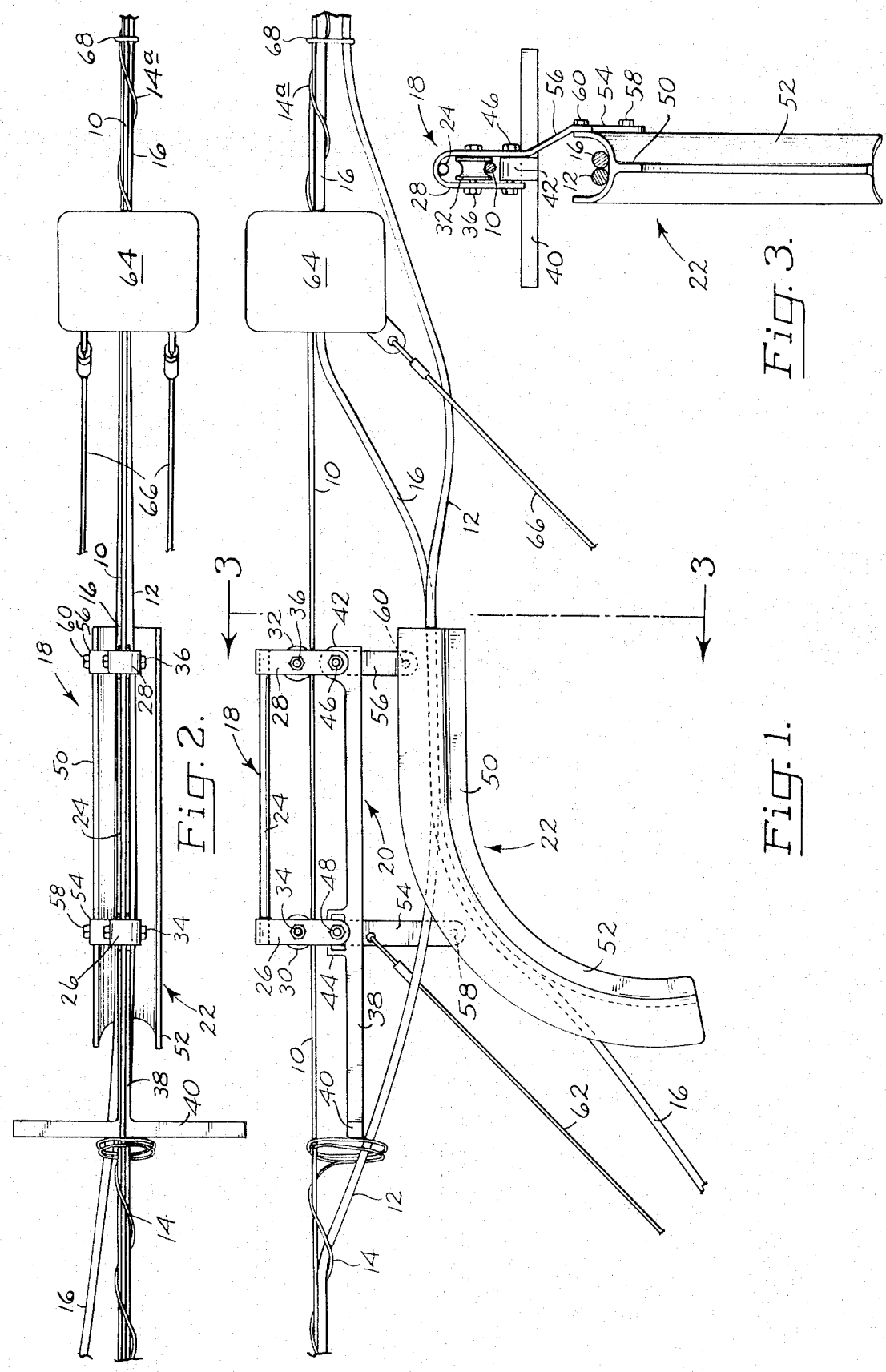

CABLE DE-LASHING TOOL

This invention relates to a tool for stripping lashing wire from cable assemblies comprising a utility cable lashed to a support line.

Telephone cables, television cables and other utility cables conventionally are strung on a support line which in turn is supported on the cross arms of spaced utility poles. The support line usually comprises a stranded cable of substantial strength.

One or more of the utility cables is fastened to the support line by spirally wrapping galvanized lashing wire about both the utility cable and support line. The wire used for this purpose normally comprises a galvanized steel wire which is resilient or springy in character. It is applied by means of a lashing tool which carries a supply of lashing wire.

The lashing tool is towed along the support line while simultaneously feeding the utility cable to it. It thereupon operates to wrap the lashing wire spirally about both the support line and the utility cable, firmly securing the latter to the former.

As time progresses, it occasionally becomes necessary to separate the cable from the support line. This may become necessary, for example, when it is desired to abandon the cable, to replace it with another cable, or to add one or more additional cables to the cable assembly.

Removing the lashing wire in order to accomplish the foregoing purposes obviously can be a tedious procedure. As presently accomplished, it involves traveling along the line in a hydraulic ladder truck. The lashing wire is clipped at frequent intervals and manually unwrapped to free the cable from the support line. This obviously is time consuming and expensive.

It is the general purpose of the present invention to provide a cable de-lashing tool, and a method of de-lashing, the application of which makes it possible to remove the lashing wire from lashed cable assemblies rapidly, efficiently, and inexpensively.

Another object of the present invention is to provide a cable de-lashing tool which is versatile in its application to the removal of the de-lashing wire from lashed cable assemblies including varying numbers of cables of various sizes.

Another object of the invention is the provision of a cable de-lashing tool which may be operated from pole to pole without the necessity of employing expensive equipment such as hydraulic ladder trucks.

Another object of the invention is the provision of a cable de-lashing tool which cooperates effectively with a following lashing appliance of conventional construction.

Still a further object of the present invention is the provision of a cable de-lashing tool which is simple in construction, relatively inexpensive, safe to use, and has a long service life.

The foregoing and other objects of this invention are accomplished by the provision of a cable de-lashing tool which, broadly considered, comprises trolley means adapted to be towed or pushed along the support line of a lashed cable assembly. The trolley means mounts a wire stripping bar dimensioned and positioned for insertion between the utility cable and support line.

As a preliminary step, the lashing wire is clipped at each pole by a lineman. Since the lashing wire inherently is resilient, it springs back when clipped and becomes loosely coiled about the cable and its support line.

The presently described tool takes advantage of this characteristic of the lashing wire. Upon being drawn or pushed along the cable assembly, it bears against the loose spirals of the clipped lashing wire and pushes it forwardly, creating a loose ball of wire. This ball is pushed to one side of the next succeeding pole where a lineman severs the component loops and removes the pieces. He then transfers the tool to the other side of the pole where the process is repeated.

Considering the foregoing in greater detail and with particular reference to the drawings, wherein:

FIG. 1 is a view in side elevation of the hereindescribed cable de-lashing tool illustrated in its use in de-lashing an old cable from, and subsequently lashing a new cable to, a support line.

FIG. 2 is a top plan view of the de-lashing tool, and

FIG. 3 is a vertical section taken along line 3—3 of FIG. 1.

As noted above, the hereindescribed cable de-lashing tool is applicable to removing the lashing wire from cable assemblies comprising a support wire strung between poles and having one or more utility cables lashed thereto. In the form of the invention illustrated, the lashed cable assembly comprises a support wire 10, a utility cable 12, and lashing wire 14.

Support line 10 has a length and stranding characteristics suited to its particular purpose.

Utility cable 12 may comprise a telephone or TV cable of substantial size and comprising several hundred individual conductors wrapped in an outer sheath.

Lashing wire 14 normally comprises galvanized steel wire having a diameter of about 0.035 inch and characterized by a degree of resilience sufficient to cause the tightly spiralled wire to spring back and become slightly separated from both the support line and the utility cable when it is clipped at spaced intervals.

In the illustrated situation, removal of old cable 12 and its replacement by new cable 16 is contemplated. In preparation for the de-lashing operation, a lineman has clipped lashing wire 14 at predetermined intervals, for example from pole to pole. To accomplish the de-lashing he then mounts the hereindescribed delashing tool adjacent the pole at the point of clipping.

The de-lashing tool basically comprises a trolley, indicated generally at 18 and designed to ride along the support wire; a de-lashing bar indicated generally at 20 and adapted to push the de-lashing wire ahead of the trolley as the latter moves along the wire; and a guide shoe indicated generally at 22, supported on the trolley and designed to guide the old cable as it is removed from the support cable and also to guide the new cable, if one is applied, as it is mounted on the support line.

Trolley 18 comprises a rod 24 of substantial strength and rigidity. It is designed to be mounted above support line 10 in substantial alignment therewith. It mounts at each of its ends a pair of yoke-shaped supports 26, 28. These extend downwardly from rod 24. They mount respectively a pair of support wheels 30, 32 rotatably mounted on bolts 34, 36, respectively. These serve as axles. Wheels 30 are dimensioned to track on support line 10.

Wire stripping bar 20 basically comprises a T-shaped member made of rectangular steel bar stock. The shank 38 of the bar lies substantially at right angles to a cross member 40. The latter comprises a pushing head designed for bearing engagement against the de-lashing wire as it balls up ahead of the tool.

Means are provided for detachably securing the wire-stripping bar in operative position to the trolley.

To this end the shank of the bar is provided with a perforated boss 42. It further is provided with an eye 44 at an appropriate intermediate point to provide a spacing between the perforation of the boss and eye 44 equal to the spacing between yoke-shaped support members 26, 28. Bolts 46, 48 penetrating appropriately disposed aligned openings in the support members thereupon provide a means for attachment of the wire stripping bar.

Cable guide 22 comprises a shoe preferably formed in an arc and thus comprising a horizontal segment 50 and a downwardly arcuate segment 52. As seen particularly in FIG. 3, guide 22 is trough-shaped and of sufficient size to accommodate two or more utility cables.

It is arranged in such a manner that downwardly arcuate section 52 guides old cable 12 as it is stripped from the line. It also guides new cable 16 as it is fed to the support line from a location on the ground.

Appropriate means are provided for supporting guide 22 in operative position below and substantially aligned with trolley 18 and stripping bar 20. It is a particular feature of the invention that the support means is arranged in such a manner as to permit feeding the utility cables to the guide sideways, since it is impractical to thread them in endwise.

To this end there are provided extensions 54, 56 extending downwardly on the same side from yoke-shaped support members 26, 28, respectively. These are removably secured to guide 22 by means of bolts 58, 60, respectively. This manner of attachment of the guide leaves a longitudinal gap on the left hand side, as viewed in FIG. 3, which permits feeding the cables sideways into the guide.

As indicated above, the de-lashing tool of my invention may either be towed or pushed along the support wire. If it is to be towed, there is provided a towing cable 62 attached to an appropriate point in the leading end of the trolley assembly.

If it is to be pushed, a suitable pushing element such as a conventional lashing tool 64 may be mounted on the support wire behind the de-lashing tool. This is pulled by one or more tow cables 66. Upon towing the lashing tool 66 along the support line, it abuts the de-lashing tool and drives it on ahead.

OPERATION

The hereindescribed cable de-lashing tool is applicable in at least three commonly encountered situations, i.e., removing the old cable from the support line and replacing it with a new one, adding a new cable to an existing cable on the support line, and removing the old cable without replacement, when the line is to be abandoned. The hereindescribed de-lashing tool greatly facilitates carrying out all of these operations.

In the first situation, which is illustrated, the lineman first clips lashing wire 14 at intervals of from pole to pole. Springback thereupon separates the lashing wire from both the support line and utility cable.

The lineman then mounts the de-lashing tool at one of the poles and inserts the cross head 40 of bar 20 in the interval between support line 10 and old cable 12. A conventional lashing tool 64 is mounted on the support line directly behind the delashing tool.

Both units then are pulled along the line to the next telephone pole. Wire stripping bar 20 then acts to ball up lashing wire 14 and push it on ahead to the next succeeding pole.

This frees old cable 12 which is guided by the horizontal segment 50 of guide 22 to a position behind lashing tool 64. It may be permitted to drop to the ground or fastened temporarily to the support line behind lashing tool 64 by means of ties 68, pending a later disposition. New cable 16 then is guided by shoe 22 into lashing unit 64. This attaches it to support line 10 by means of its own supply of new lashing wire 14*a*.

When the units have reached the next pole, the ball of old lashing wire 14 pushed ahead of the de-lashing unit is clipped in several places by the lineman and removed. Both the de-lashing and lashing units then are transferred to a position forwardly of the pole and the procedure repeated.

The second of the above noted operation, i.e., adding a new cable to the old cable assembly is carried out similarly except that the old cable is fed with a new cable through lashing unit 64 so that both are lashed simultaneously to the support line.

The third operation, i.e., removing the old cable without supplying a new one, is carried out in a similar manner except that the old cable is permitted to drop to the ground.

Having thus described my invention in preferred embodiments, I claim as new and desire to protect by Letters Patent:

1. A tool for stripping a length of clipped lashing wire from cable assemblies comprising a utility cable lashed with wire to a support line, the tool comprising
   a. trolley means adapted to ride along the support line and
   b. wire-stripping bar means mounted on the trolley means,
   c. the bar means being dimensioned and positioned for placement between the utility cable and support line in bearing engagement with the lashing wire.

2. The tool of claim 1 wherein the bar means comprises T-bar means, the cross piece of the T being arranged for bearing engagement with the lashing wire.

3. The tool of claim 1 wherein the trolley means comprises
   a. a rod positioned above the support line in substantial alignment therewith,
   b. a pair of longitudinally spaced, yoke-shaped supports secured in spaced relation to the rod with the legs of the yoke straddling the support line,
   c. a pair of rollers journaled one between the legs of each of the yoke-shaped supports for rolling engagement with the support line, and
   d. bar means securing means for securing the bar to the yoke-shaped supports in a horizontal plane below that of the support line.

4. The tool of claim 3 wherein the wire stripping bar means comprises T-bar means and wherein the bar means securing means comprises bolt means releasably securing the bar means to the support means.

5. The tool of claim 1 including cable guide means mounted on the trolley means.

6. The tool of claim 5 wherein the cable guide means comprises a trough-shaped shoe having a body portion substantially aligned with the wire stripping bar means and an arcuate leading portion extending downwardly therefrom.

7. The tool of claim 1 wherein the trolley means comprises
   a. a rod positioned above the support line in substantial alignment therewith,
   b. a pair of longitudinally spaced, yoke-shaped supports secured in spaced relation to the rod with the legs of the yoke straddling the support line,
   c. a pair of rollers journaled one between the legs of each of the yoke-shaped supports for rolling engagement with the support line, and
   d. bar means securing means for securing the bar means to the yoke-shaped supports in a plane below that of the support line,
   e. the corresponding legs of both yoke-shaped supports on one side thereof being substantially elongated,
   f. and including cable guide shoe means secured in operative position on the elongated legs of said yoke-shaped supports.

8. The tool of claim 1 including flexible tow cable means connected to the trolley means for towing the same along the support line.

9. The method of stripping a length of lashing wire from cable assemblies comprising a utility cable lashed spirally with wire to a support line, the method comprising
   a. severing the lashing wire at spaced intervals to provide a length of wire in a condition of spring-back separation from both the support line and utility cable,
   b. inserting a bar between the support line and the utility cable in bearing engagement with the length of lashing wire,
   c. passing the bar along the cable assembly, thereby balling the lashing wire ahead of the bar,
   d. severing the convolutions of the resulting ball at intervals and
   e. separating the resulting wire pieces from the support line and utility cable.

* * * * *